United States Patent
Lasch

(10) Patent No.: US 6,736,767 B2
(45) Date of Patent: May 18, 2004

(54) MACHINE TOOL WITH TOOL SPINDLE AND TOOL EXCHANGER

(75) Inventor: Thorsten Lasch, Aspach (DE)

(73) Assignee: Deckel Maho Seebach GmbH, Seebach (DE)

( * ) Notice: Subject to any disclaimer, the term of this patent is extended or adjusted under 35 U.S.C. 154(b) by 0 days.

(21) Appl. No.: 10/380,016

(22) PCT Filed: Apr. 3, 2002

(86) PCT No.: PCT/EP02/03710
§ 371 (c)(1),
(2), (4) Date: Mar. 11, 2003

(87) PCT Pub. No.: WO02/087820
PCT Pub. Date: Nov. 7, 2002

(65) Prior Publication Data
US 2003/0186795 A1 Oct. 2, 2003

(30) Foreign Application Priority Data
Apr. 12, 2001 (DE) .......................... 101 18 595

(51) Int. Cl.⁷ ................................................ B23Q 3/157
(52) U.S. Cl. .......................... 483/34; 483/38; 483/39; 483/50
(58) Field of Search .............................. 483/36, 38, 39, 483/40, 41, 48, 31, 32, 62, 67, 66; 29/40; 74/813

(56) References Cited

U.S. PATENT DOCUMENTS 4,237,595 A * 12/1980 Kitamura ...................... 29/40
4,837,919 A * 6/1989 Hoppe ........................... 483/38
4,873,756 A * 10/1989 Yamane et al. ................ 483/56
5,020,210 A * 6/1991 Fujimoto ....................... 483/54
5,439,434 A * 8/1995 Sato et al. ..................... 483/48
5,451,196 A 9/1995 Rutschle ....................... 483/39
5,855,541 A * 1/1999 Rutschle ....................... 483/39

FOREIGN PATENT DOCUMENTS

| DE | 4406386 | 8/1995 | ...................... 3/18 |
| DE | 9600055 | 7/1997 | ...................... 3/157 |
| FR | 2328634 | 5/1997 | ...................... 1/12 |

* cited by examiner

Primary Examiner—A. L. Wellington
Assistant Examiner—Dana Ross
(74) Attorney, Agent, or Firm—Bourque & Associates, P.A.

(57) ABSTRACT

A machine tool with a driven tool spindle that is rotatable about a spindle axis that includes a tool exchanger including grippers to displace tool-holders or tools between a receiver position in the tool spindle and a storage position, or vice versa. The tool-holders or tools in these two positions are identically oriented, and the storage position and the receiver position are displaced with respect to each other along the spindle axis direction of the tool spindle. The tool exchanger possesses a transport mechanism that includes a carrier element pivotable about a pivot axis inclined with respect to the spindle axis, to which grippers pivotable about axes perpendicular to each other are connected. Guide elements are mounted so they may be driven and rotate about the first axis parallel to the pivot axis in the opposite direction to the pivot direction of the carrier element are included on the carrier element. Each of these guide elements is connected with grippers so they may rotate about second axes extending parallel to the spindle axis.

11 Claims, 4 Drawing Sheets

US 6,736,767 B2

MACHINE TOOL WITH TOOL SPINDLE AND TOOL EXCHANGER

TECHNICAL FIELD

The invention relates to a machine tool of the type including a tool exchanger.

BACKGROUND OF THE INVENTION

A machine tool of the conventional type disclosed in DE 196 00 055 A1 includes a tool exchanger with longitudinal and latitudinal spars connected to a jointed rectangle via cross-spars, whereby the longitudinal spars may be driven about axes parallel to one another. The conventional solution requires a relatively large space that is often not available because of the close proximity to the tool spindle. Also, adequate stability may be achieved by the multi-part conventional solution only using large dimensions. The concomitant high weight limits the potential exchange speed.

A device for the transport of machine tools that includes a threaded rod connected to a motor that moves along a fixed worm gear is also known from DE 44 06 386 A1. The drive of the first threaded rod is connected to a second threaded rod of the same transmission ratio. The second threaded rod is connected to a worm gear bearing the tool. A transmission provided with a coupling is positioned between the two threaded rods. Use of worm gear drives limits the displacement speed of the tool.

SUMMARY OF THE INVENTION

Based on this state of the art, it is the task of this invention to create a machine tool of the discussed type that includes a space-saving, stable, and rapid tool exchanger.

The solution of this task derives from a machine tool, in accordance with the present invention, comprising a tool spindle (1; 1') rotatable about a spindle axis (1a) and a tool exchanger including at least one pivotable gripper (2; 2') for displacing tool holders (4) or tools between a receiving position in the tool spindle (1; 1') and a storage position or vice versa. The orientation of the tool holder (4) or tools in the receiving and storage positions is identical, and wherein the storage position and receiving position are displaced with respect to each other along the direction of the spindle axis (1a) of the machine tool (1; 1').

The machine tool of the present invention also includes transport mechanism that includes a driven inclined carrier element (3; 3') rotatable about a pivot axis (5) inclined to the spindle axis (1a), to which carrier element (3; 3') and the at least one pivotable gripper (2; 2'; 2") are connected about mutually-perpendicular axes, and wherein guide elements (10) are included on and driven by said carrier element (3; 3') that include a central drive gear wheel (3a). The carrier element (3; 3') are mounted such that they may rotate about a first axes (8) that is parallel to the pivot axis (5) in the direction opposite to a pivoting movement of the carrier element (3; 3') about the pivot axis (5). Each of these first axes (8) are connected to the at least one gripper (2; 2'; 2") and wherein the at least one gripper rotates about second axes (9) extending parallel to the spindle axis (1a). The components possess relatively low mass, so that the tool exchanger may switch rapidly. Only one rotatable carrier element is provided to which grippers are mounted and guided along their unalterable directions.

Advantageous embodiments of the invention may be derived from the dependent claims recited herein.

BRIEF DESCRIPTION OF THE DRAWINGS

These and other features and advantages of the present invention will be better understood by reading the following detailed description, taken together with the drawings wherein.

DETAILED DESCRIPTION OF THE PRESENT INVENTION

Figure 1:
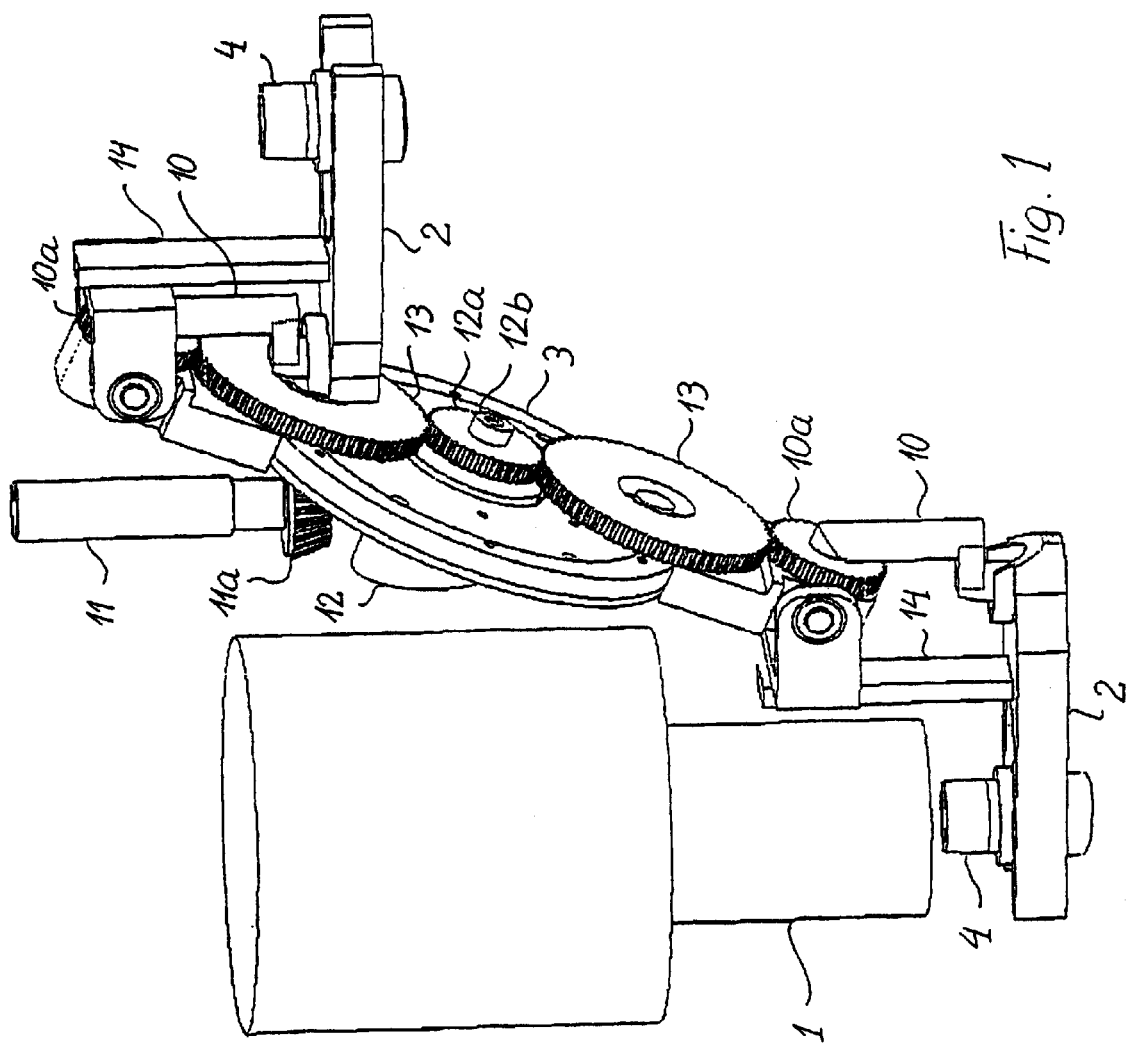
FIG. 1 is a right side plan view of the machine tool with tool spindle and tool exchanger in accordance with the present invention.
Figure 2:
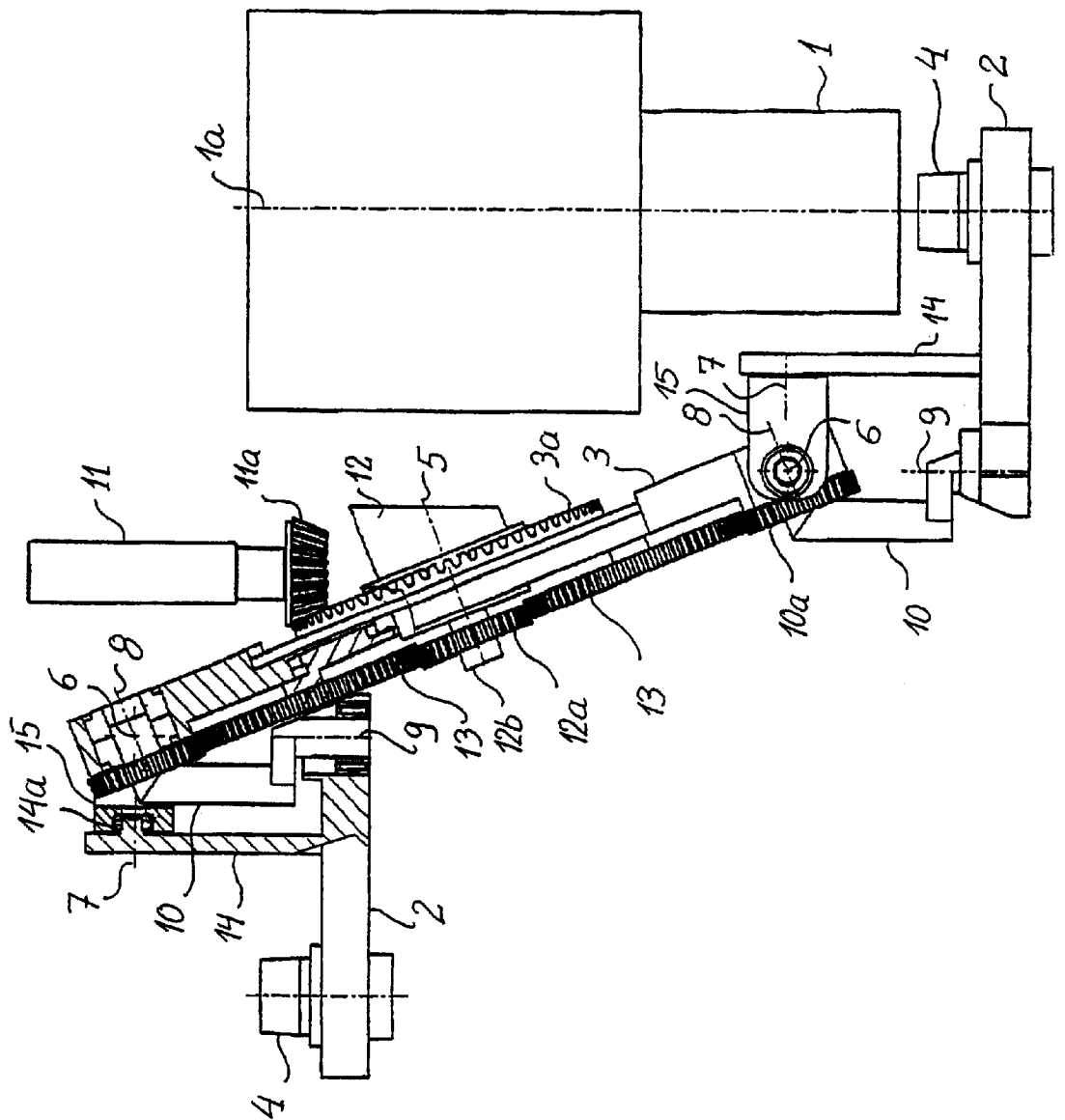
FIG. 2 is a left side plan view of the machine tool with tool spindle and tool exchanger in accordance with the present invention.
Figure 3:
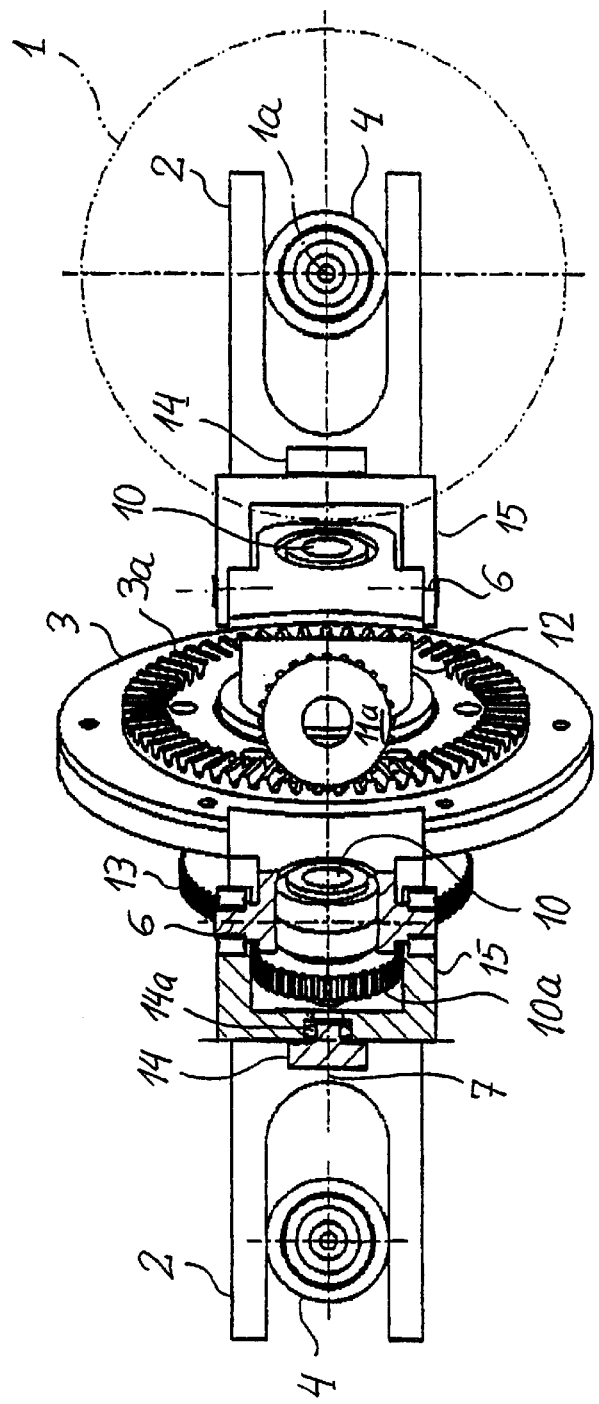
FIG. 3 is a top plan view of the machine tool with tool spindle and tool exchanger in accordance with the present invention.

In the figures, identical or similar-functioning parts are labeled using identical reference indices which may be distinguished from one another using ' or " marks. As shown in FIGS. 1–3, only one tool spindle 1 of a machine tool that may be rotated about a vertical spindle axis 1a is shown, although this is not a limitation of the present invention. The machine tool spindle 1 is mounted so that it may be displaced along the direction of the spindle axis 1a. The lower end of the machine tool spindle 1 includes at its lower end at least one known gripping device (not shown) in which the tool holder 4 may be gripped.

By means of a headstock (not shown) supporting the machine tool spindle 1, a vertically-displaceable housing 12 is firmly connected with a journal 12b on which a carrier element 3 is mounted so that it may swivel about a pivot axis 5. The pivot axis 5 is inclined with respect to the spindle axis 1a. A gear wheel 12a is firmly mounted on the journal 12b so that it may not rotate. The carrier element 3 is driven by means of a bevel gear drive wheel 3a firmly attached to the carrier element 3. Drive is produced by a pinion gear 11a firmly attached to a drive shaft 11 that meshes with the drive gear wheel 3a.

Two grippers 2 are mounted on the carrier element 3 diametrically opposed to each other that surround the tool holder 4 about its outer circumference, and which in turn are attached to a holder element 14. The holder element 14 is mounted opposite the carrier element 3 so that it may pivot about two axes 6 and 7 perpendicular to each other. The axis 7 is formed by a bearing journal 14a on the holder element 14 that is mounted in a bracket 15 so that it may rotate. The bracket 15 surrounds a gear wheel 10a, and is in turn mounted to the carrier arm 3 so that it may rotate about the axis 6.

The gear wheel 10a is firmly attached to a guide 10 that is mounted on the carrier element 3 so that it may rotate about a first axis 8 extending parallel to the pivot axis 5. The gear wheel 10a engages an intermediary gear wheel 13 mounted on the carrier element 3 so that it may rotate, with the gear wheel 13 meshing with the central gear wheel 12a. As the carrier element 3 pivots, the intermediary gear wheel 13 "see-saws" against the central gear wheel 12a. The transmission ratio between the central gear wheel 12a and the gear wheel 10a attached to the guide 10 is 1:1. Two intermediary wheels 13 are provided for the two grippers 2 of the transport mechanism.

The bearing journal area of the guide 10 supported by the carrier element 3 and supporting the gear wheel 10a is inclined in a first area perpendicularly downward. The guide 10 is crimped in crank fashion at its end opposite the bearing journal area, and forms a cog that is mounted in a bearing on the gripper 2 so that it may rotate.

During pivoting of the carrier element 3, the guide 10 is pivoted by the same angle but in the opposite direction. Thus, the area of the guide 10 in contact with the bearing journal area constantly maintains its perpendicular orientation. In this manner, the gripper 2 pivots from its initial, upper position opposing a magazine (not shown) into a lower position facing the machine tool spindle 1 in which a tool holder 4 may be received by the working-material spindle 1 via displacement along the spindle axis 1*a*. The grippers 2 are aligned to each other during this pivoting.

For a tool exchange, a previously-used tool holder 4 is removed from the tool spindle 1*a* by one of the grippers 2, and a tool holder 4 with a new tool is removed by the other gripper 2 from the storage magazine. After rotating through 180°, the tool holder 4 with the new tool is located in the receiver position below the tool spindle, and the used tool is in the storage position.

Vertical displacement motion of the entire mechanism for the raising or lowering to the spindle or magazine position is performed separately.

Figure 4:
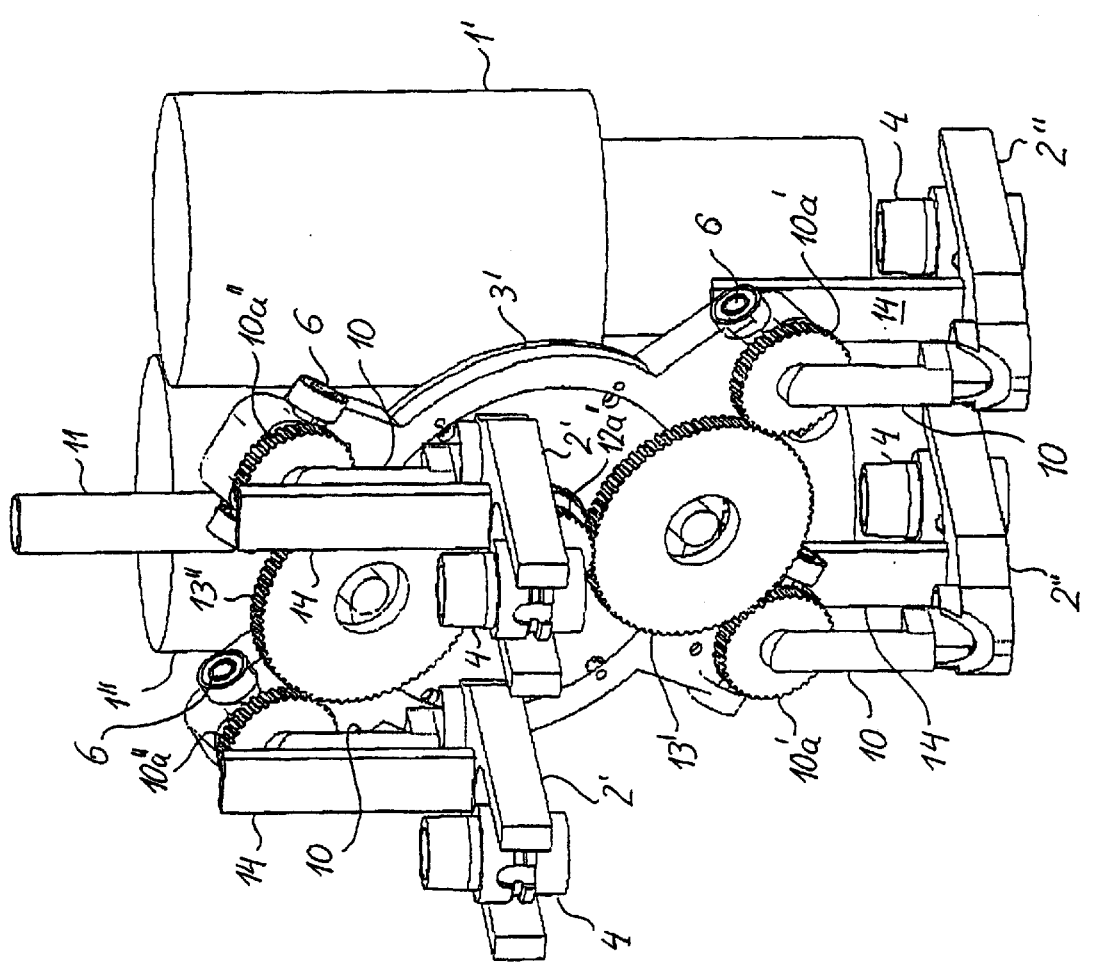
FIG. 4 is a plan view of the machine tool with tool spindle and tool exchanger in accordance with the present invention.

Regarding the embodiment shown in FIG. 4, the exchange procedure for tools or tool holders 4 described above in this second embodiment may also be used with a machine tool with two tool spindles 1' and 1" extending parallel to each other. The tool exchanger includes a carrier element 3' on which four grippers 2' or 2" are mounted. One intermediary gear wheel 13' or 13" each meshes with two gear wheels 10*a*' or 10*a*", each of which is attached to a guide 10 in the manner described above. The grippers 2' or 2" are identical, and are implemented the same as in the first embodiment. The gripper 2' of the first pair and the gripper 2" of the second pair are arranged parallel to each other. During tool exchange, two tool holders 4 are simultaneously or non-simultaneously removed from the two tool spindles 1' and 1", or are passed to them, and two tool holders 4 are pre-positioned into the storage position.

In the embodiment examples shown and described, the rotational movement of the guides is implemented with 1:1 transmission ratio via intermediary gear wheels 13 or 13' or 13". A corresponding but opposite rotational movement of the guides with 1:1 transmission ratio may also be achieved using other suitable means, such as via toothed belts that interact with the gear wheels, or with chains that interact with chain pulleys.

In the illustrated embodiments, the spindle axis la is always positioned vertically. Instead, the spindle axis may also assume any other direction differing from the vertical direction, such as a horizontal alignment for a horizontal tool spindle, or a sharply-inclined direction for an inclined tool spindle.

Modifications and substitutions by one of ordinary skill in the art are considered to be within the scope of the present invention which is not to be limited by the claims which follow.

What is claimed is:

1. A Machine tool comprising:

a tool spindle (1; 1') rotatable about a spindle axis (1*a*);

a tool exchanger including at least one pivotable gripper (2; 2') for displacing tool holders (4) or tools between a receiving position in the tool spindle (1; 1') and a storage position or vice versa, and whereby the orientation of the tool holder (4) or tools in the receiving and storage positions is identical, and wherein the storage position and receiving position are displaced with respect to each other along the direction of the spindle axis (1*a*) of the machine tool (1; 1'); and a transport mechanism that includes a driven inclined carrier element (3; 3') rotatable about a pivot axis (5) inclined to the spindle axis (1*a*), to which carrier element (3; 3') and the at least one pivotable gripper (2; 2'; 2") are connected about mutually-perpendicular axes, and wherein guide elements (10) are included on and driven by said carrier element (3; 3') that include a central drive gear wheel (3*a*), said carrier element (3; 3') being mounted so it may rotate about a first axes (8) that is parallel to the pivot axis (5) in the direction opposite to a pivoting movement of the carrier element (3; 3') about the pivot axis (5), each of these first axes (8) being connected to said at least one gripper (2; 2'; 2") rotating about second axes (9) extending parallel to the spindle axis (1*a*).

2. The machine tool as in claim 1, wherein the central drive gear wheel (3*a*) is a component of a bevel gear drive.

3. The machine tool as in claim 1, wherein the guide elements (10) driven about the first axes (8) opposite to the pivot motion about the pivot axis (5) include rotatable gear wheels (10*a*; 10*a*' 10*a*").

4. The Machine tool as in claim 1, wherein the gear wheels (10*a*; 10*a*' 10*a*") are coupled with a central, fixed, non-rotatable gear wheel (12*a*; 12*a*') of generally the same diameter.

5. The machine tool as in claim 1, wherein the coupling of the gear wheels (10*a*; 10*a*' 10*a*"; 12*a*; 12*a*') is accomplished using intermediary wheels (13; 13') mounted on the carrier element (3; 3') so that they may rotate.

6. The machine tool as in claim 5, wherein the axes (6 and 7) connecting each said at least one gripper (2; 2') to the carrier element (3; 3') intersect with the first and second axes (8 and 9) at a single point.

7. The machine tool as in claim 1, wherein the guide elements (10) are crimped.

8. The machine tool as in claim 1, wherein the tool exchanger includes two grippers (2) diametrically opposed to the pivot axis.

9. The machine tool as in claim 1, wherein it includes two tool spindles (1'; 1") that may be driven to rotate about the spindle axes (1*a*) extending parallel to each other, and wherein the tool exchanger includes four grippers (2'; 2"), two of which are identically oriented.

10. The machine tool as in claim 9, wherein the gear wheels (10*a*; 10*a*' 10*a*") connected with the guide elements (10) of the two identically-oriented grippers (2'; 2") mesh with a common intermediary wheel (13'; 13").

11. The machine tool as in claim 10, wherein the opposing rotational motion of the guide elements (10) may also be realized at a 1:1 drive ratio using other drives such as, for example, toothed belts or chains.

\* \* \* \* \*